March 22, 1955     H. J. RAND     2,704,650
FAUCET
Filed July 29, 1948
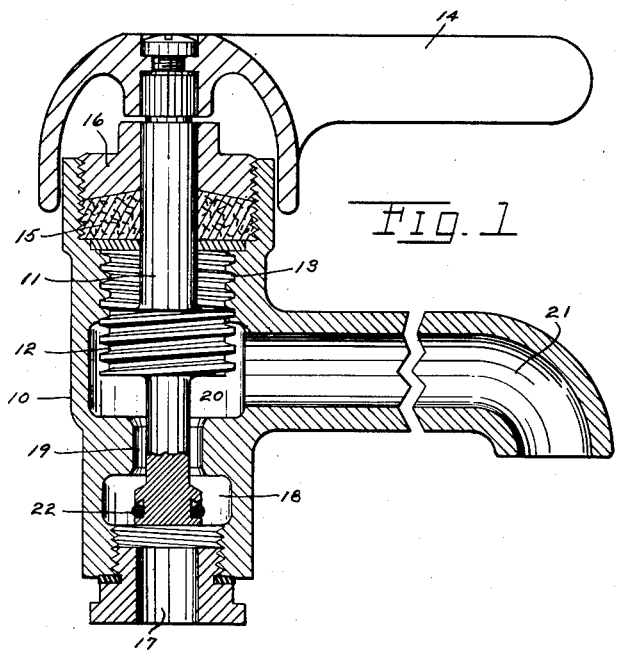
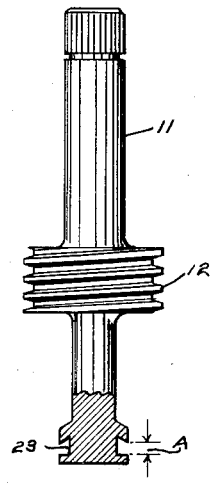
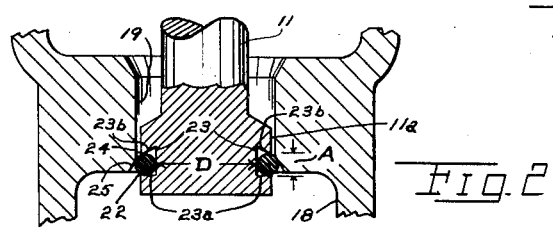
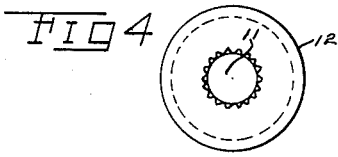
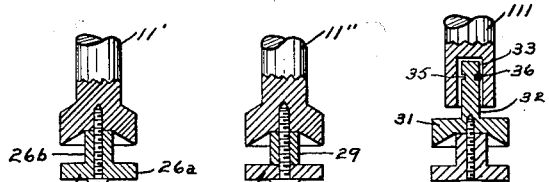
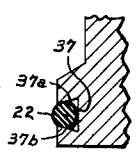 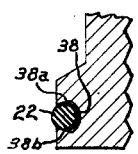 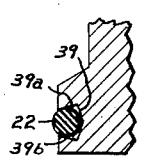
INVENTOR.
HENRY J. RAND
BY
Hyde, Meyer, Baldwin & Doran
ATTORNEYS

United States Patent Office 2,704,650
Patented Mar. 22, 1955

2,704,650

FAUCET

Henry J. Rand, Bratenahl, Ohio, assignor to Magic Seal, Inc., Bratenahl, Ohio, a corporation of Ohio Application July 29, 1948, Serial No. 41,219

2 Claims. (Cl. 251—324)

This invention relates to improvements in a faucet or a valve for controlling liquid flow.

One of the objects of the present invention is to provide a type of faucet which may be turned on and off with fingertip control.

Another object of the present invention is to provide a valve which may be turned on and off literally millions of times and still continue to function perfectly.

Still another object of the present invention is to provide a seal wherein an O-ring engages a substantially cylindrical surface, the O-ring being so constructed and arranged that it provides a tight sealing action with very little wear on the ring.

Other objects and advantages of the present invention will be apparent from the accompanying drawings and description and the essential features will be set forth in the appended claims.

In the drawings,

Fig. 1 is a central sectional view through a faucet equipped with my novel valve;

Fig. 2 is an enlarged fragmental sectional view showing a portion of Fig. 1 with the parts in a different position;

Fig. 3 is a view of the valve stem of Fig. 1 and without any O-ring position;

Fig. 4 is a top plan view of Fig. 3;

Fig. 5 is a sectional view through the ring-holding end of a modified form of valve stem comprising two pieces;

Fig. 6 is a view similar to Fig. 5 showing the same parts but utilizing three different pieces instead of two;

Fig. 7 is a view similar to Figs. 5 and 6 showing another modification wherein the ring-holding end of the stem is comprised of two pieces having a floating mounting in the valve stem;

Figs. 8, 9, and 10 are enlarged fragmental sectional views of the lower end of the valve stem showing modified forms of ring-holding recesses.

Those familiar with this art will readily understand that it has been desirable for a great many years to provide a faucet which may be turned on and off many times by the use of very slight pressure and still give efficient opening and closing action and without appreciable wear on the sealing gasket or washer. I have provided the novel construction shown in Fig. 1 wherein the faucet body 10 carries a valve stem 11, the upper portion of which is of usual form and is provided with threads 12 which engage with coacting threads 13 in the valve body so that as the stem is rotated by means of the handle 14, the valve stem is given a vertical movement in the valve body to manipualte the valve. The upper end of the valve body is closed by means of a packing gland 15 and a packing nut 16. The liquid inlet to the faucet is through the conduit 17 which communicates with a small chamber 18 then through passageway 19 and main chamber 20 to the outlet conduit 21. The lower end of the valve stem carries a resilient annular ring 22, one common form of which is known as an O-ring. This ring is suitably mounted in the lower end of the stem 11 so that as the stem moves upwardly from the position of Fig. 1, the ring 22 engages the cylindrical walls of the passageway 19 so as to close off the flow of liquid. Conversely, when the valve is in the position of Fig. 1, the flow is uninterrupted from conduit 17 to conduit 21.

Those familiar with this art will understand that others have built faucets or valves utilizing annular rings of the O-ring type for closing off a passageway but in all of these known to me, the annular sealing ring similar to 22 has been pushed downwardly into a bore similar to 19 in order to close off the liquid flow. In such a case the water pressure acting on the resilient annular ring as it approaches sealing position expands the ring radially outwardly and as it engages the bore the O-ring is chewed so badly that such faucets or valves give very short service. It is an object of the present invention to avoid this difficulty by the means now to be described.

It will be noted that the sealing ring 22 of Fig. 1 provides its sealing action against the bore 19 as the valve stem 11 is raised by manipulation of the handle 14 causing the threads 12 and 13 to cooperate with each other in such a manner as to lift the valve. In Fig. 2 I have shown an enlarged view of the parts of Fig. 1 in order to explain my theory of the sealing action. The annular ring 22 here shown is substantially circular in section and of rubber-like material of approximately seventy durometer although I am not limited to this hardness. In this form of my device, I find it important that the annular ring 22 have some resiliency and that the diameter D of the recess 23 in the valve stem be slightly greater than the inside diameter of the ring 22 when in unstretched condition. For instance, I have found that if the diameter D is ten to fifteen thousandths of an inch larger than the inside diameter of the ring 22 in its unstretched condition, then the ring 22 when placed in the position of Figs. 1 and 2 will be slightly stretched and this holding of the ring resiliently against the valve stem diameter D will prevent the ring 22 from chattering as the valve is opened and closed. This also insures concentricity between the O-ring 22, the valve stem 11 and the bore 19. In one form of my valve where the ring 22 has a normal or nominal outside diameter of seven-sixteenths of an inch the inside diameter of the ring 22 is held to .301 inch plus or minus .005 inch and the diameter across the cross section of ring 22 is .070 inch plus or minus .003 inch. From these dimensions, it will be noted that I am relying upon a ring of very small cross sectional area in order to do the sealing operation.

The formation and dimensions of the groove or recess 23 in the lower end of the valve stem 11 are very important. In the form shown in Figs. 1, 2, and 3 and referring particularly to Fig. 2, the lower wall 23a of the recess is approximately horizontal and the upper wall 23b slopes outwardly and downwardly at an angle of approximately twenty to forty degrees to the horizontal. I find that if this angle is much steeper than forty degrees, then there is too little of the ring 22 extending radially outwardly beyond the surface 11a of the valve stem and the edge 24 becomes so sharp that there is danger of it cutting into the resilient ring 22. The dimension A across the mouth of the recess as measured vertically in Fig. 2 should be exactly equal to or .003 inch under the sectional diameter of the O-ring 22 in its stretched condition when in the positions of Figs. 1 and 2. In other words, the ring 22 in its stretched condition, that is, when stretched over the diameter D, must fit snugly in the mouth of the recess at the dimension indicated as A.

My theory of the operation of the valve as it moves from the position of Fig. 1 to the closing position of Fig. 2 is as follows: As the parts reach the position of Fig. 2 the ring 22 engages a slightly chamfered edge 25 at the lower end of the bore 19. This chamfer 25 cams the sealing ring 22 into the bore 19 without any excessive wear on the ring 22. It is my theory that as the parts reach the position of Fig. 2 or as the valve stem moves very slightly upwardly therefrom, the liquid under pressure in the chamber 18 enters radially inwardly underneath the ring 22 and exerts a force radially outwardly in the recess 23 urging the ring 22 to expand into firm engagement with the bore 19. In this form of my device wherein the recess 23 converges to a narrower throat radially outwardly, it is my theory that I balance the resiliency of the ring 22 and its tendency to be expanded by the liquid pressure against the slope 23b of the recess 23 which tends to limit this outward expansion.

In operation the device of Figs. 1 and 2 is very easily moved from the position of one figure to the other or to a position farther inside the bore 19 than that shown in Fig. 2 for a complete sealing action. This movement from sealed to unsealed position may be done with a fingertip touch and provide a very tight seal. There is absolutely no dripping of the faucet and the stream discharged at the conduit 21 may be controlled from a very slight trickle to a full flow as desired. On a test apparatus I have opened and closed the device shown in Figs. 1 and 2 literally millions of times and still obtained efficient sealing action without appreciable wear of the resilient ring 22.

In Figs. 5, 6, and 7 I have shown the left hand end of Fig. 3 as somewhat enlarged and showing other ways of forming this end of the stem. Whereas in Fig. 3 this end of the stem is formed integrally with the entire stem 11, in Fig. 5 I have formed the device in two pieces, namely, the stem 11′ and the part 26 comprising the circular head 26a having a central cylindrical stem 26b which engages a flat circular surface at the lower end of the stem 11′. A screw 27 secures these parts together.

In Fig. 6 three parts are utilized to provide the complete device. The stem 11″ has its lower end formed similarly to the lower end of the device of Fig. 5. The circular disk 28 and the separate cylindrical piece 29 are secured to the stem member 11″ by means of the screw 30 passing through all of these members.

In Fig. 7 I have shown an arrangement where the O-ring holding portion of the stem has a floating contact with the stem 111. Here the portion 31 has a stem 32 which extends into a bore 33 in the lower end of the stem 111. The lower face of the circular member 31 as viewed in Fig. 7 is provided with a surface similar to the lower end of the stems 11′ and 11″ described in connection with Figs. 5 and 6. The member 26′ is similar to the member 26 described in Fig. 5. A screw 34 holds the parts 26′ and 31 together. When the parts are assembled in a faucet in a position similar to that shown in Figs. 1 and 2, the normal liquid pressure being exerted upwardly from the chamber 18 would normally hold the parts in proper position. To insure this, however, I may provide an annular groove 35 in the stem 32 and secure a pin 36 in this groove tangent to the stem 32 and extending into the stem 111 so that the parts 31 and 26′ cannot move endwise but are free to rotate about the axis of the stem 111.

In Figs. 8, 9 and 10, I have shown other forms which the recess 23 in the lower end of the stem 11 may take. In Fig. 8, the cylindrical vertical wall 37 joins a top wall 37a and a bottom wall 37b, each of which slopes radially outwardly and toward the opposing wall, so that the ring 22 is held in position snugly as in the first described form of my invention.

In Fig. 9 the inner wall 38 is formed concavely outwardly so as to receive the ring 22 snugly. Here both the upper wall 38a and the lower wall 38b converge toward each other as they extend radially outwardly.

In the form of my device shown in Fig. 10, the inner wall 39 is of V-shape opening outwardly and the upper wall 39a and the lower wall 39b converge toward each other as they extend radially outwardly.

What I claim is:

1. In a valve, a body providing a through passageway for liquid including a substantially cylindrical bore, said passageway having a liquid inlet and a liquid outlet, a stem passing through said bore, said stem having a portion of an outside diameter providing slight clearance in said bore, an annular recess in said stem portion opening radially outwardly, an uninterrupted annular sealing ring of rubber-like material of the order of 70 durometer hardness in said recess, the inside diameter of said recess being slightly greater than the normal inside diameter of said ring in unstretched condition, whereby said ring in said recess is stretched, the walls of said recess on opposite sides of said ring converging radially outwardly at an angle between 20 degrees and 40 degrees, the open outer mouth of said recess being of a dimension between exactly equal to and .003 inch under the sectional diameter of said sealing ring in its stretched condition in said recess, the radial depth of said recess being less than the sectional diameter of said sealing ring in its stretched condition in said recess whereby said sealing ring in said recess extends radially outwardly beyond said stem portion to engage said bore, and means for moving said stem portion from a position on the inlet side of said bore where said valve is open to a position inside said bore where said valve is closed.

2. In a valve, a body providing a through passageway for liquid including a cylindrical bore, said passageway having a liquid inlet and a liquid outlet, a stem passing through said bore, said stem having a portion of an outside diameter providing slight clearance in said bore, an annular recess in said stem portion opening radially outwardly, an uninterrupted annular sealing ring in said recess and extending radially outwardly beyond said stem portion to engage said bore, the walls of said recess converging radially outwardly, means for moving said stem portion from a position on the inlet side of said bore where said valve is open to a position inside said bore where said valve is closed, said ring being of rubber-like material of the order of 70 durometer hardness, the inside diameter of said recess being slightly greater than the normal inside diameter of said ring in unstretched condition, said ring being normally circular in section, the walls of said recess on opposite sides of said ring converging radially outwardly at an angle between 20 degrees and forty degrees, and the open outer mouth of said recess being of a dimension not greater than the diameter of said ring section when said ring is stretched in said recess.

References Cited in the file of this patent

UNITED STATES PATENTS

| | | |
|---|---|---|
| 394,475 | Dwyer | Dec. 11, 1888 |
| 2,314,683 | Berry | Mar. 24, 1943 |
| 2,358,228 | Hoof | Sept. 12, 1944 |
| 2,417,242 | Eckel | Mar. 11, 1947 |
| 2,427,787 | Hunter | Sept. 23, 1947 |
| 2,490,511 | Courtot | Dec. 6, 1949 |
| 2,524,142 | Seeloff | Oct. 3, 1950 |

FOREIGN PATENTS

| | | |
|---|---|---|
| 9,164 | Great Britain | 1915 |
| 177,010 | Switzerland | 1935 |